INVENTORS:
Alfred H. Colton, Jr.
Howard G. Thrasher

By Ernest L. Brown
Attorney

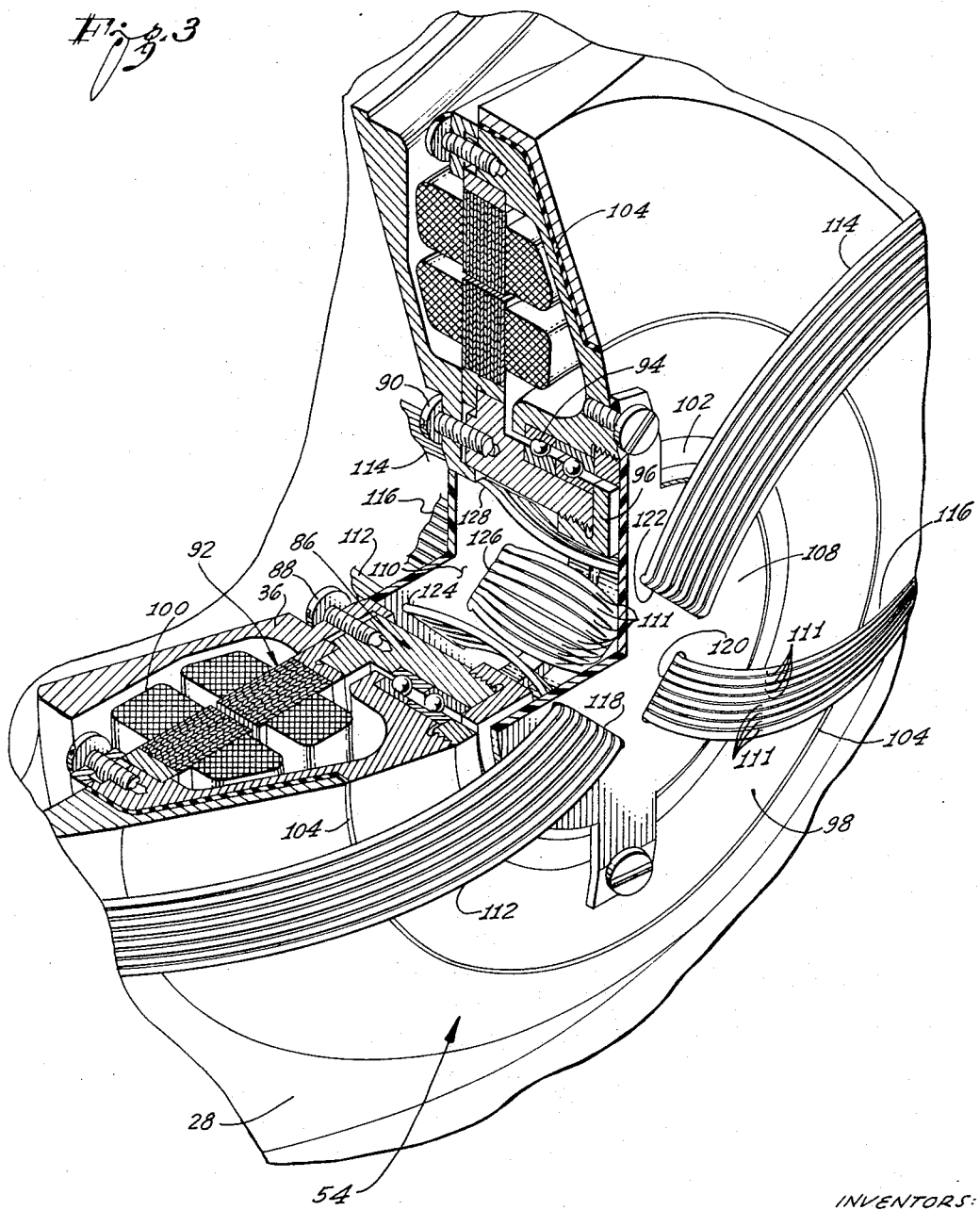

United States Patent Office 3,340,739
Patented Sept. 12, 1967

3,340,739
SEGMENTED GIMBALS
Alfred H. Colton, Jr., Encino, Los Angeles, and Howard G. Thrasher, Tarzana, Los Angeles, Calif., assignors to Litton Systems, Inc., Beverly Hills, Calif.
Filed Dec. 11, 1964, Ser. No. 417,544
16 Claims. (Cl. 74—5.5)

This invention pertains to a gimbal assembly, and more particularly to a gimbal assembly in which the individual gimbals are segmented and adjacent pairs of segments on a common axis of rotation are assembled together.

In the fabrication of gyroscopic navigational equipment such as gyroscopic stabilized platforms, and the like, it is customary to support at least one of the structures by a multiple gimbal structure. It is customary to form each of the gimbals in one piece, to machine the precision surfaces of the gimbals, and to balance the entire gimbal. The gimbals are then assembled into a complete gimbal assembly.

The structure contemplated by this invention uses gimbals which are fabricated in pieces, fastened together, and aligned with alignment pins or bushings. Adjacent gimbal segments of adjacent gimbals, having a common axis, are assembled together in nested fashion. One of the two gimbal segments, usually the inner one, supports a hub assembly which is substantially circularly symmetrical with a predetermined desired axis of freedom of the gimbal segment. On the outer periphery of the hub assembly is supported a rotation bearing, and one portion of an electromagnetic synchro or angular pick off, or one piece of an electromagnetic torque applying mechanism or torquer.

The second gimbal forms an opening which is substantially circularly symmetrical about the predetermined axis of rotation of the second gimbal segment, said axis of rotation after assembly being coincident with the axis of rotation of the first gimbal segment. Positioned within the opening formed in the second gimbal is a housing which is circularly symmetrical about the predetermined axis of rotation of the second gimbal segment. The housing is supported for rotation relative to the hub assembly of the first gimbal upon the aforementioned bearings and is bonded on its outer periphery by an elastic film to the second gimbal.

The housing is adapted to support the second half of the synchro, pick off, or torquer without unwanted deflection due to temperature variations. Most electromagnetic devices have an iron core. Consequently, it is desirable to fabricate the housing of materials such as non-magnetic stainless steel, titanium, beryllium, and the like, to avoid variations in the properties of the electromagnetic device with changing temperature.

The elastic film between the housing and the second gimbal may be an elastomer such as rubber or a plastic. The function of the elastic film is to allow dimensional change between the housing and the second gimbal arising from differential thermal expansion. The gimbal material is usually chosen for light weight while the housing material is chosen for dimensional stability.

In a preferred embodiment of the invention, the hub is hollow to form an electrical conduit. Flexible tapes are channeled through the conduit and supported by electrical headers attached to the housing on the second gimbal and to the hub on the first gimbal. In this fashion, slip rings are eliminated.

This invention, therefore, contemplates gimbals which are fabricated in segments with the objective of low cost being easily interchangeable, being easily manufactured, reducing cost of repairs, and being stored in partially assembled condition.

It is another object of the invention to support a pair of gimbals on a common axis of relative rotation allowing for thermal expansion, the support of flexible cables, vibration damping, and the support of electromagnetic devices for generating signals which are measures of the angular relation between the gimbal segments or for supporting electromagnetic devices which are adapted to apply torque between the gimbal segments about their common axis of relative rotation.

It is another object of this invention to reduce the cost of gimbal assemblies.

It is still another object of this invention to increase the ease of maintenance of gimbal assemblies.

It is also an object of this invention to eliminate slip rings from gimbal assemblies.

It is a more particular object of this invention to provide an apparatus, machine, and article of manufacture for achieving the above enumerated objects.

Other objects will become apparent from the following description, taken in connection with the accompanying drawings, in which:

FIGURE 3 is a view, partially in profile and partially in section of the structure of FIGURE 2 adjacent the common axis of rotation.

Figure 1:
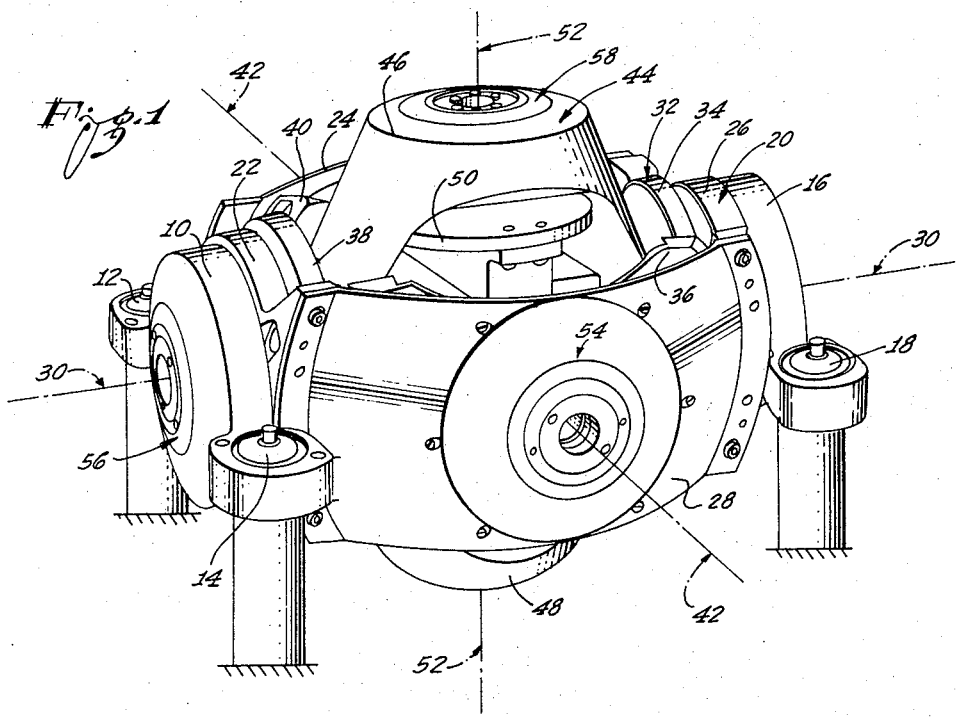
FIGURE 1 is a typical gimbal assembly using segmented gimbals of this invention.

Referring to FIGURE 1, a gimbal 10 is supported relative to a supporting vehicle (not shown) by a pair of shock mounts 12 and 14. Similarly gimbal 16 is supported relative to the supporting vehicle by a pair of shock mounts 18 and another mount (not shown).

A gimbal 20 is fabricated of four gimbal segments 22, 24, 26, and 28. Gimbal 20 is supported for rotation relative to gimbals 10 and 16 about an axis 30 which is usually parallel with the roll axis of the supporitng craft and is then called an outer roll axis.

A gimbal 32 is fabricated of gimbal segments 34, 36, 38, and 40. Gimbal 32 is supported for rotation relative to gimbal 20 about an axis 42 which is frequently called the pitch axis although, under roll conditions, it may be misaligned from the pitch axis of the supporting vehicle.

Gimbal 44 is made of two segments 46 and 48. Gimbal 44 is mounted for rotation relative to gimbal 32 about an axis which, in FIGURE 1, is roughly parallel to axis 30 and is frequently called the inner roll axis.

A stabilized platform, gyroscope, or other device 50 is mounted for rotation relative to gimbal 44 about an axis 52 which is frequently called the azimuth axis and is usually substantially vertical.

The gimbals 10 and 16 are identical, gimbals 22 and 26 are identical, gimbals 24 and 28 are identical, gimbals 34 and 38 are identical, gimbals 36 and 40 are identical, and gimbals 46 and 48 are identical. The bearing structures 54, 56 and 58 and the bearings, not shown in FIGURE 1, on the outer roll axis, the pitch axis, the inner roll axis, and the azimuth axis are substantially the same as the shown bearings except that one may enclose a synchro while another encloses a torquer and that one may have an ordinary bearing while the other has a bearing with a damper such as that set forth in patent application Ser. No. 417,543, filed Dec. 11, 1964, now U.S. Patent Number 3,316,036 entitled "Damped Bearing by Erling J. Bligard, Alfred H. Colton, Jr., and Howard G. Thrasher. Further, no electrical header is shown in FIGURES 1 and 2, but easily may be seen in FIGURE 3.

Figure 2:
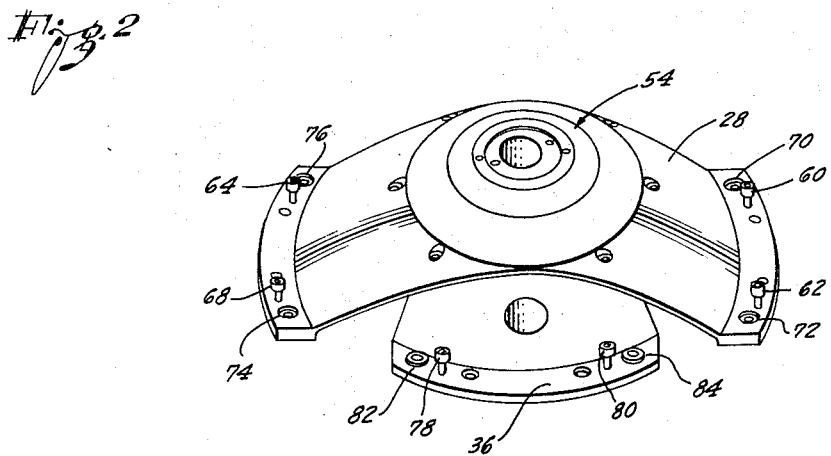
FIGURE 2 is a pair of adjacent, nested, segmented gimbals assembled in accordance with this invention.

Referring to FIGURE 2, the gimbals 28 and 36 are shown in nested, assembled relation as they would be stored for replacement. Typically, screws 60, 62, 64, and 68 would be used to fasten gimbal 28 to gimbal 22. Alignment pins or bushings 70, 72, 74, 76 are included to cause precise alignment of gimbals 22, 28, and 26. Similarly screws 78 and 80 would be used to fasten gimbal 36 to gimbal 38 while alignment pins or bushings 82 and 84 would be used to ensure alignment between gimbals 36 and 38.

In FIGURE 3, details of the nested gimbal structure adjacent the axis is shown in detail. In FIGURE 3, a hub assembly 86 is attached, for example, by screws 88 and 90 to gimbal 36. Hub assembly 86 is symmetrical about the desired axis of rotation of gimbal 36 relative to gimbal 28. Hub 86 supports one member 92 of an electrical synchro. Alternatively, member 92 could be of an electrical angular pick off of a different kind or one member of an electromagnetic torquing device. Ball bearings 94 are shown attached to the outer periphery of hub 86. The bearings are held on by retaining member 96. Although bearings 94 are shown as ball bearings, it is obvious that air bearings, journal bearings, bearings of the kind shown in the above mentioned patent application, or other types of bearings may be used.

A housing 98 is mounted upon bearings 94 for rotation relative to hub 86. Housing 98 also supports portion 100 of an electrical synchro, angular pick off, or torquing device. Housing 98 is held to bearings 94 by retaining ring 102. Housing 98 is fabricated of material such as titanium, non-magnetic stainless steel, beryllium, or the like to have expansion characteristics which are substantially the same as the cores of the synchro member 100.

Between gimbal 28 and housing 98 is a thin film of elastic material which is adapted to compensate for differential expansion between gimbal 28 and housing 98 due to temperature changes. Typically, gimbal 28 is fabricated of aluminum, magnesium, or beryllium while housing 98 is fabricated of titanium, non-magnetic stainless steel, or the like. In addition to compensating for expansion, the film of elastic material 104 absorbs vibration energy thereby damping the transmission of such vibration. Elastic film 104 is preferably an elastomer such as rubber or a plastic. The film 104 is bonded, preferably over its entire surface, to housing 98 and to gimbal 28. In a preferred embodiment the elastic film 104 is a sheet of rubber which is heat bonded or vulcanized both to housing 98 and to gimbal 28.

Electrical energy and signals are typically carried between gimbals by slip rings and brushes. The nested gimbal configuration of this invention uses a pair of electrical headers 106 and 108 to support substantially flat electrical cables which are channeled through a conduit 110 formed in hub 86. Header 106 is attached to gimbal 36 while header 108 is shown attached to housing 98.

First electrical cables fabricated, for example, of plastics or rubberized material have conductors such as conductors 11 embedded therein. The flat cables such as cables 112, 114, and 116 are each channeled through a diffeernt slot such as slots 118, 120, and 122 in header 108. The slots are preferable as radially far from the axis of rotation as the size of conduit 110 permits to minimize the opposition of the tapes to twisting. The tapes are channeled through conduit 110 and slots such as slots 124, 126, and 128 in header 106. Slots 124, 126, and 128 are positioned similarly to the positioning of slots 118, 120, and 122 to reduce the opposition of the tapes to twisting. Within the conduit region 110, tapes 112, 114, and 116 are preferably cut into smaller strips to make them more flexible to reduce the opposition of the tapes to relative twisting between headers 106 and 108.

Thus, the nested gimbal structure of this invention is a structure which is easily manufactured, easily assembled, contains the required rigidity of structure for a precision gimbal, is easily standardized to be interchangeable, has an inexpensive and efficient structure for conducting electricity across the gimbals, and has a rigid housing for supporting synchros, pick offs, torquers and the like with a required dimensional stability. It should be noted that the desirable features of this invention reduce the cost to the user by a substantial figure.

Although the device of this invention has been described in detail, it is not intended that the inveniton should be limited by this description but only in accordance with the spirit and scope of the appended claims.

We claim:
1. In combination:
an inner partial gimbal and an outer partial gimbal having a common axis for rotation between said gimbals;
a hub member, attached to said inner gimbal for rotation therewith;
a first electromagnetic member, attached to the outer periphery of said hub, substantially concentrically with said axis;
a support for en electromagnetic member;
bearing means between said hub and said support allowing freedom of rotation therebetween about said axis;
a second electromagnetic member, attached to said support means, positioned in proximity to said first member to interact magnetically with said first member, and concentric with said axis; and
an elastic member between said outer gimbal and said support means, to compensate for thermal expansion and to damp vibration transmission.
2. In combination:
an inner partial gimbal having a hub assembly substantially circularly symmetrical about a predetermined axis, including bearing means on the outer periphery of said hub;
a housing attached to said bearings for rotation about said axis relative to said gimbal and hub assembly; and
an outer partial gimbal bonded by a film of elastic material to said housing to turn therewith.
3. The device as recited in claim 2 in which said film of elastic material is an elastomer.
4. A device as recited in claim 2 in which said film of elastic material is rubber, bonded to said housing and said outer gimbal.
5. A device as recited in claim 2 and further comprising a synchro, positioned and attached to said housing and said hub assembly, adapted to generate signals which are a measure of the relative rotation between said gimbals about said axis.
6. A device as recited in claim 2 and further comprising electromagnetic torque generating means, attached to said housing and said hub and adapted to generate a torque between said gimbals about said axis.
7. A device as recited in claim 4 and further comprising electrical synchro means, connected to said housing and said hub assembly to generate signals which are a measure of relative rotation between said gimbals about said axis.
8. A device as recited in claim 4 and further comprising electromagnetic means attached to said housing and said hub assembly to apply a torque about said axis between said gimbals.
9. A device as recited in claim 4 in which said hub forms a hollow conduit and further comprising a first header, attached to the inner end of said hub and a second header attached to said housing near the end of said conduit, said headers having slots formed therein which are adapted to receive flexible electrical cable strands; and a plurality of flexible cable strands passing through said slots in said second header, through said conduit, and through said slots in said first header.
10. In combination:
first and second partial gimbals, adapted to have a common axis of rotation therebetween, the first of said gimbals having a hub assembly including bearing means on the outer periphery thereof;
the second of said gimbals having a housing, bonded to said second gimbal and said housing engaging said bearing, said housing being attached to said second gimbal by a film of elastic material which is heat bonded to said housing and said second gimbal resisting rotation between said housing and said second gimbal, damping vibrations between said housing and said second gimbal, and accommodating thermal expansion between said housing and said second gimbal.

11. A device as recited in claim 10 in which said hub forms an electrical conduit including a first header moving with said first gimbal and a second header moving with said second gimbal; and flexible cable in said conduit between said headers for carrying electrical signals and power between said gimbals.

12. In combination:
an inner partial gimbal and an outer partial gimbal having a common axis for rotation between said gimbals; and
bearing means mounted upon said partial gimbals in coaxial relation to allow said relative rotation between said partial gimbals.

13. In combination:
an inner partial gimbal and an outer partial gimbal having a common axis for rotation between said gimbals;
a first electromagnetic member, attached to said outer partial gimbal for rotation therewith about said axis;
a second electromagnetic member attached to said inner partial gimbal for rotation therewith about said common axis and positioned in proximity to said first electromagnetic member to interact magnetically with said first electromagnetic member; and
bearing means between said partial gimbals allowing relative freedom of rotation of said partial gimbals about said common axis.

14. A device as recited in claim 13 in which said electromagnetic members are components of an angular sensing means.

15. A device as recited in claim 13 in which said electromagnetic members are components of a means for applying torque between said gimbals about said common axis.

16. A device as recited in claim 13 in which said electromagnetic means are components of means for sensing angular rotation between said partial gimbals about said common axis and means for applying torque between said partial gimbals about said common axis.

References Cited

UNITED STATES PATENTS

| | | | |
|---|---|---|---|
| 2,983,151 | 5/1961 | Nord | 74—5.5 |
| 3,134,265 | 5/1964 | Krupick et al. | 74—5.5 |

FRED C. MATTERN, JR., *Primary Examiner.*

J. PUFFER, C. J. HUSAR, *Assistant Examiners.*